(12) United States Patent
Sebastian et al.

(10) Patent No.: US 8,931,493 B2
(45) Date of Patent: Jan. 13, 2015

(54) SMOKELESS TOBACCO PRODUCTS

(75) Inventors: Andries D. Sebastian, Clemmons, NC (US); E. Matthew Reddick, Clemmons, NC (US)

(73) Assignee: R.J. Reynolds Tobacco Co., Winston-Salem, NC (US)

( * ) Notice: Subject to any disclaimer, the term of this patent is extended or adjusted under 35 U.S.C. 154(b) by 1052 days.

(21) Appl. No.: 12/917,171

(22) Filed: Nov. 1, 2010

(65) Prior Publication Data

US 2012/0103353 A1    May 3, 2012

(51) Int. Cl.
- *A24B 15/00* (2006.01)
- *A24B 13/00* (2006.01)
- *A24B 15/28* (2006.01)
- *B65D 51/20* (2006.01)

(52) U.S. Cl.
CPC ............ *A24B 13/00* (2013.01); *A24B 15/282* (2013.01); *B65D 51/20* (2013.01)
USPC ...................................................... 131/352

(58) Field of Classification Search
USPC ...................................................... 131/352
See application file for complete search history.

(56) References Cited

U.S. PATENT DOCUMENTS

| | | |
|---|---|---|
| 1,376,586 A | 5/1921 | Schwartz |
| 4,513,756 A | 4/1985 | Pittman et al. |
| 4,528,993 A | 7/1985 | Sensabaugh, Jr. et al. |
| 4,607,479 A | 8/1986 | Linden |
| 4,624,269 A | 11/1986 | Story et al. |
| 4,631,899 A | 12/1986 | Nielsen |
| 4,660,577 A | 4/1987 | Sensabaugh et al. |
| 4,987,907 A | 1/1991 | Townend |
| 5,092,352 A | 3/1992 | Sprinkle, III et al. |
| 5,167,244 A | 12/1992 | Kjerstad |
| D335,934 S | 5/1993 | Howard |
| 5,346,734 A | 9/1994 | Wydick, Jr. |
| 5,387,416 A | 2/1995 | White et al. |
| 6,162,516 A | 12/2000 | Derr |
| 6,383,431 B1 | 5/2002 | Dobrin et al. |
| 6,730,832 B1 | 5/2004 | Dominguez et al. |
| 6,834,654 B2 | 12/2004 | Williams |
| 6,895,974 B2 | 5/2005 | Peele |
| 7,014,039 B2 | 3/2006 | Henson et al. |
| 7,025,066 B2 | 4/2006 | Lawson et al. |
| 7,124,883 B1 | 10/2006 | Thomas et al. |
| 7,498,281 B2 * | 3/2009 | Iwasaki et al. ................ 442/382 |

(Continued)

FOREIGN PATENT DOCUMENTS

| | | |
|---|---|---|
| WO | WO 2004/095959 A1 | 11/2004 |
| WO | WO 2005/016036 A1 | 2/2005 |

(Continued)

OTHER PUBLICATIONS

International Search Report PCT/US2011/058015, 3 pgs., mailing date Feb. 2, 2012.

(Continued)

*Primary Examiner* — Richard Crispino
*Assistant Examiner* — Dionne Walls Mayes
(74) *Attorney, Agent, or Firm* — Brinks Gilson & Lione (57) ABSTRACT

A smokeless tobacco product is provided. A tobacco product configured for insertion into the mouth of a user of that product comprises a water-permeable pouch containing a tobacco formulation that includes a granular tobacco composition, wherein the pouch comprises a fleece material configured to provide enhanced flavor.

16 Claims, 4 Drawing Sheets

(56) References Cited

U.S. PATENT DOCUMENTS

| | | |
|---|---|---|
| D594,154 S | 6/2009 | Patel et al. |
| 7,694,686 B2 | 4/2010 | Atchley et al. |
| 7,810,507 B2 | 10/2010 | Dube et al. |
| D630,525 S | 1/2011 | Patel et al. |
| 2004/0048532 A1 | 3/2004 | Tharreau |
| 2004/0118422 A1 | 6/2004 | Lundin et al. |
| 2004/0217023 A1 | 11/2004 | Fagg et al. |
| 2005/0061339 A1 | 3/2005 | Hansson et al. |
| 2005/0244521 A1 | 11/2005 | Strickland et al. |
| 2006/0162732 A1 | 7/2006 | Winn et al. |
| 2006/0191548 A1 | 8/2006 | Strickland et al. |
| 2007/0062549 A1 | 3/2007 | Holton, Jr. et al. |
| 2007/0186941 A1 | 8/2007 | Holton, Jr. et al. |
| 2007/0261707 A1 | 11/2007 | Winterson et al. |
| 2008/0029110 A1* | 2/2008 | Dube et al. .................... 131/275 |
| 2008/0166395 A1 | 7/2008 | Roush |
| 2008/0173317 A1 | 7/2008 | Robinson et al. |
| 2008/0302682 A1 | 12/2008 | Engstrom et al. |
| 2009/0025738 A1 | 1/2009 | Mua et al. |
| 2009/0293895 A1* | 12/2009 | Axelsson et al. ............. 131/352 |
| 2010/0018540 A1 | 1/2010 | Doolittle et al. |

FOREIGN PATENT DOCUMENTS

| | | |
|---|---|---|
| WO | WO 2005/041699 A2 | 5/2005 |
| WO | WO 2006/004480 A1 | 1/2006 |
| WO | WO 2007/138484 A2 | 12/2007 |
| WO | WO 2010/014506 A2 | 2/2010 |

OTHER PUBLICATIONS

International Preliminary Report on Patentability for International Application No. PCT/US2011/058015, dated May 7, 2013, 7 pages.

* cited by examiner

SMOKELESS TOBACCO PRODUCTS

FIELD OF THE INVENTION

The present invention relates to products made or derived from tobacco, or that otherwise incorporate tobacco, and are intended for human consumption. More particularly, the present invention relates to tobacco products and packaging for tobacco products in smokeless form, including those smokeless tobacco products characterized as "snus."

BACKGROUND

Tobacco may be enjoyed in a so-called "smokeless" form. Particularly popular smokeless tobacco products are employed by inserting some form of processed tobacco or tobacco-containing formulation into the mouth of the user.

Various types of smokeless tobacco products are set forth in U.S. Pat. No. 1,376,586 to Schwartz; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,987,907 to Townsend; U.S. Pat. No. 5,092,352 to Sprinkle, III et al.; U.S. Pat. No. 5,387,416 to White et al.; U.S. Pat. No. 7,694,686 to Atchley et al.; and U.S. Pat. No. D335,934 to Howard; U.S. Pat. Pub. Nos. 2005/0244521 to Strickland et al. and 2006/0162732 to Winn et al.; 2006/0191548 to Strickland et al., 2007/0261707 to Winterson et al., 2007/0062549 to Holton, Jr. et al.; 2007/0186941 to Holton, Jr. et al.; 2008/0166395 to Roush; and PCT Pub. Nos. WO 04/095959 to Arnarp et al.; WO 06/004480 to Engstrom; WO 05/041699 to Quinter et al.; and WO 07/138,484 to Wrenn et al.; each of which is incorporated herein by reference. One type of smokeless tobacco product is referred to as "snuff." Snuff typically is formulated in "moist" or "dry" forms.

Representative smokeless tobacco products have been marketed under the trade names Oliver Twist by House of Oliver Twist A/S; Copenhagen, Skoal, SkoalDry, Rooster, Red Seal, Husky, and Revel by U.S. Smokeless Tobacco Co.; "taboka" by Philip Morris USA; and Levi Garrett, Peachy, Taylor's Pride, Kodiak, Hawken Wintergreen, Grizzly, Dental, Kentucky King, Mammoth Cave by Conwood Sales Co., L.P., Interval by Brown & Williamson Tobacco Corp., and Ariva and Stonewall by Star Scientific, Inc.

Representative types of snuff products, commonly referred to as "snus," are manufactured in Europe, particularly in Sweden, by or through companies such as Swedish Match AB, Fiedler & Lundgren AB, Gustavus AB, Skandinavisk Tobakskompagni A/S and Rocker Production AB. Snus products available in the U.S.A. are marketed under the trade names Camel Snus Frost, Camel Snus Original and Camel Snus Spice by R. J. Reynolds Tobacco Company.

Snus products, such as Camel Snus Original, are commonly supplied in small teabag-like pouches. The pouches are typically a nonwoven fleece material, and contain about 0.4 to 1.5 grams of pasteurized tobacco. These products typically remain in a user's mouth for about 10-30 minutes. Unlike certain other smokeless tobacco products, snus do not require expectoration by the user.

Consumers may find that the flavor and sensations of the tobacco in a snus fleece pouch are different than loose tobacco. The fibers of these fleece fabrics generally are configured to retain the tobacco particles and many are made predominantly of viscose (regenerated cellulose, also called rayon) with a coating of an acrylic polymer that acts as the fiber binder in the nonwoven fabric and provides for heat-bonding/sealing of the snus pouches. The flavor may be different qualitatively from that of other oral tobacco products. The flavor may be altered by the fleece material forming the pouch. It may be desirable to provide snus pouches with similarity to loose tobacco formulation flavors, an ability to impart flavor (that may differ in time provided and variation of flavor strength as compared to other products), and to provide a pouch that may be biodegradable The fleece used for snus also may change color after being stored over time. This color change may include yellowing of the fleece material. Some consumers may prefer a pouch that retains a particular color, or that exhibits particular color changes with use and/or the passage of time. Color may be used to indicate a flavor of a snus pouch. Snus is commonly supplied in various flavors such as Camel Snus Frost and Camel Snus Spice. The snus may be flavored by mixing flavor into the tobacco, adding microcapsules or the like to the tobacco, or adding flavor strips to the tobacco. U.S. Pat. No. 7,810,507 to Dube et al. describes numerous methods of accomplishing this, and is herein incorporated by reference in its entirety.

It may be desirable to provide pouches with differing degradability profiles, including—for example—biodegradability traits, while providing desirable pouch integrity and sensory profile (e.g., flavor, mouth-feel) during use.

It would be desirable to provide snus or other smokeless formulations with desirable components, methods of manufacturing, and packaging, all associated with efficient production of products that provide enjoyment and satisfaction when employed by a user of that smokeless tobacco product.

BRIEF SUMMARY

The present invention relates to packaging for tobacco products in smokeless form, including those smokeless tobacco products characterized as "snus." The products include a smokeless tobacco composition or formulation. For example, a smokeless tobacco formulation may include particles or pieces of tobacco and may include other ingredients, such as salts, sweeteners, binders, colorants, pH adjusters, fillers, flavoring agents, disintegration aids, antioxidants, humectants, and preservatives. The moisture content of the particles of the tobacco may vary.

The tobacco formulation can be contained within a container, such as a pouch or bag, such as is the type commonly used for the manufacture of snus types of products (e.g., a sealed, moisture permeable pouch that is sometimes referred to as a "portion"). A representative liquid-permeable pouch can be composed of a "fleece" type of material. The tobacco formulation is in turn contained within a package. The package is sealed tightly, and is composed of a suitable material, such that the atmospheric conditions within that sealed package are modified and/or controlled; that is, the sealed package can provide a good barrier that inhibits the passage of compositions such as moisture and oxygen therethrough; in addition, the atmosphere within the sealed package can be further modified by introducing a selected gaseous species (e.g., nitrogen, argon, or a mixture thereof) into the package prior to sealing or by drawing a vacuum therein (vacuum sealing). As such, the atmospheric conditions to which the tobacco composition is exposed are controlled during conditions of preparation, packing, storage and handling.

BRIEF DESCRIPTION OF THE DRAWINGS

In order to provide an understanding of embodiments of the invention, reference is made to the appended drawings, in which reference numerals refer to components of described exemplary embodiments of the invention. The drawings are exemplary only, and should not be construed as limiting the invention.

DETAILED DESCRIPTION

The present inventions now will be described more fully hereinafter with reference to the accompanying drawings. The inventions may be embodied in many different forms and should not be construed as limited to the embodiments set forth herein; rather, these embodiments are provided so that this disclosure will satisfy applicable legal requirements. Like numbers refer to like elements throughout. As used in this specification and the claims, the singular forms "a," "an," and "the" include plural referents unless the context clearly dictates otherwise.

Figure 1:
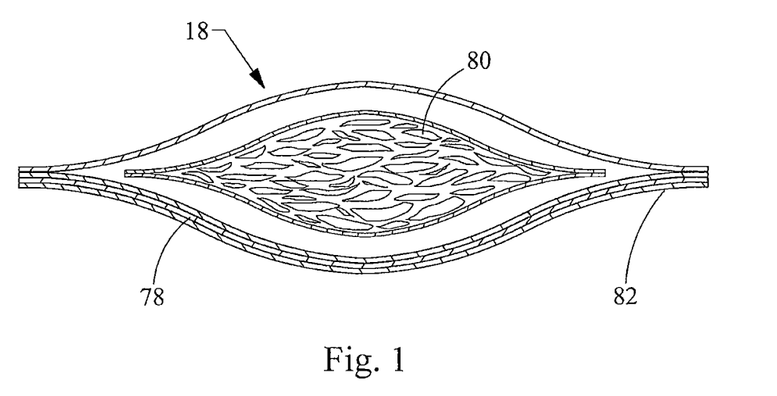
FIG. 1. is a perspective view of an open container for smokeless tobacco with part of a removable seal cut away.
Figure 2:
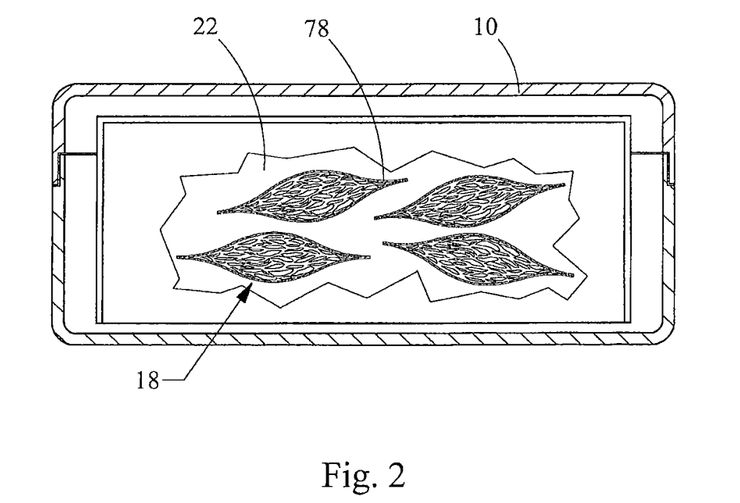
FIG. 2 is a perspective view of an open container for smokeless tobacco with the top shown in phantom and a removable seal in place.
Figure 3:
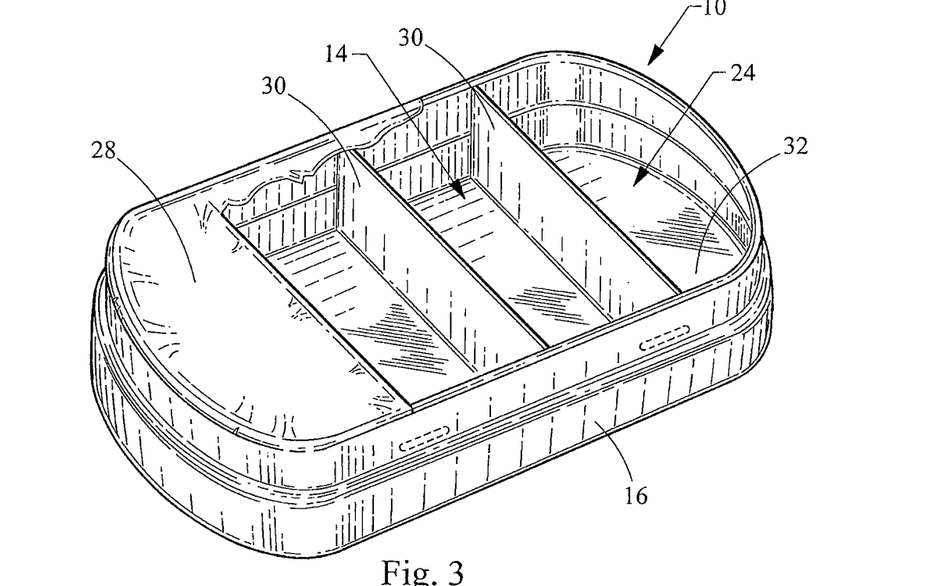
FIG. 3 is a perspective view of an open container for smokeless tobacco with a removable seal partly removed.
Figure 4:
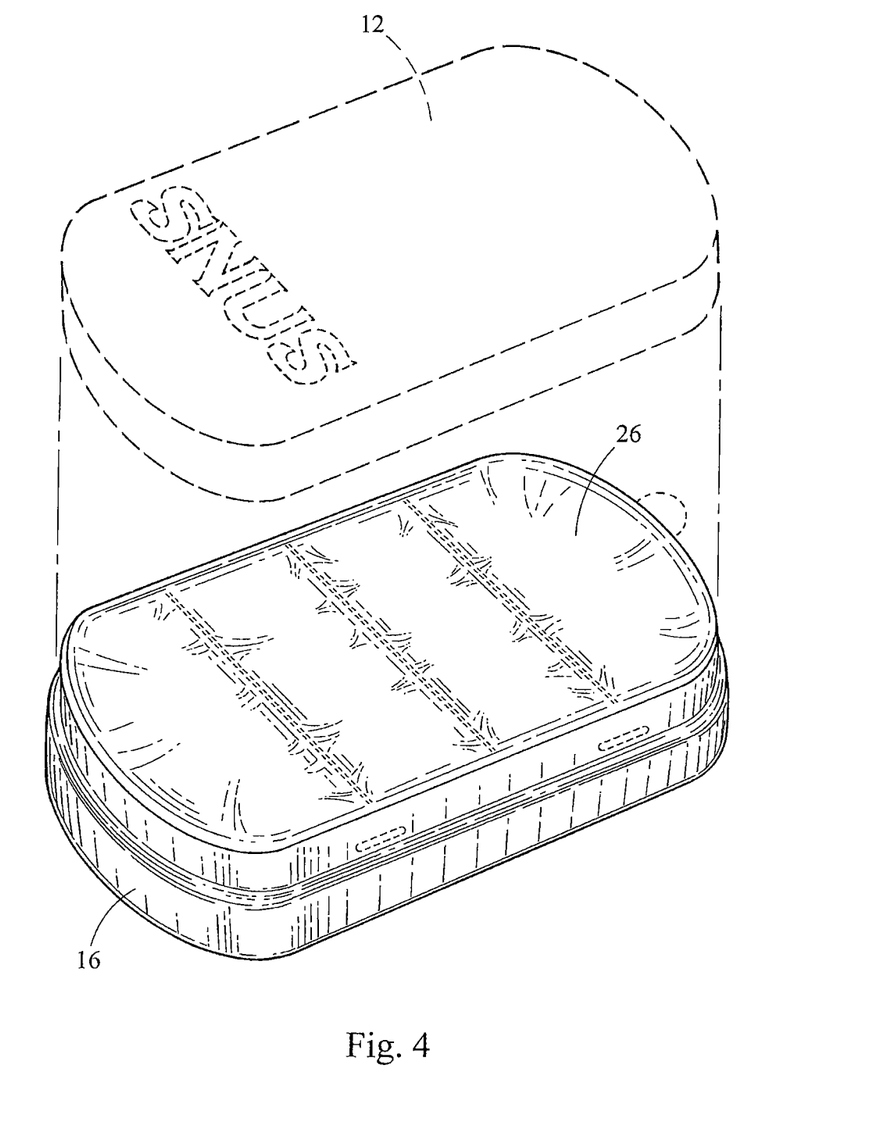
FIG. 4 is a perspective view of a closed container for smokeless tobacco.

Referring to FIGS. 1-4, a first embodiment of a snus tin 10 is shown such as that disclosed in related U.S. Pat. No. D594,154 and U.S. patent application Ser. No. 29/297,517 to Patel et al. A typical tin 10 is comprised of plastic or metal top 12 and bottom 16 pieces. FIGS. 1-3 show the tin 10 with the top 12 already removed and FIG. 4 shows the closed tin 10.

A tin 10 is the short, rounded edge, generally cylindrical container used for the marketing of snus products. See, for example, the types of representative snuff-box types of designs set forth in PCT Pub. No. WO 05/016036 to Björkholm. Other types of containers that can be suitably modified are plastic or metal type containers set forth in U.S. Pat. No. 7,014,039 to Henson et al. See, also, the types of hard containers used for the commercial distribution of Camel Snus by R. J. Reynolds Tobacco Company; Revel Mint Tobacco Packs type of smokeless tobacco product by U.S. Smokeless Tobacco Corporation; Skoal Dry by U.S. Smokeless Tobacco Co. and "taboka" by Philip Morris USA. If desired, the type of container used for the "taboka" product can be adapted to possess a slidable lid (e.g., one that slides generally parallel to the longitudinal axis of the container) so that the container can be opened and closed. If desired, the container can have an accordion or bellows type of design, such that the container can be extended open for filling with smokeless tobacco product during production, and then contracted after filling of the container is complete. If desired, containers can be equipped with suitable seals or grommets, so that when an opened container is re-shut, a good seal is provided.

Figure 5:
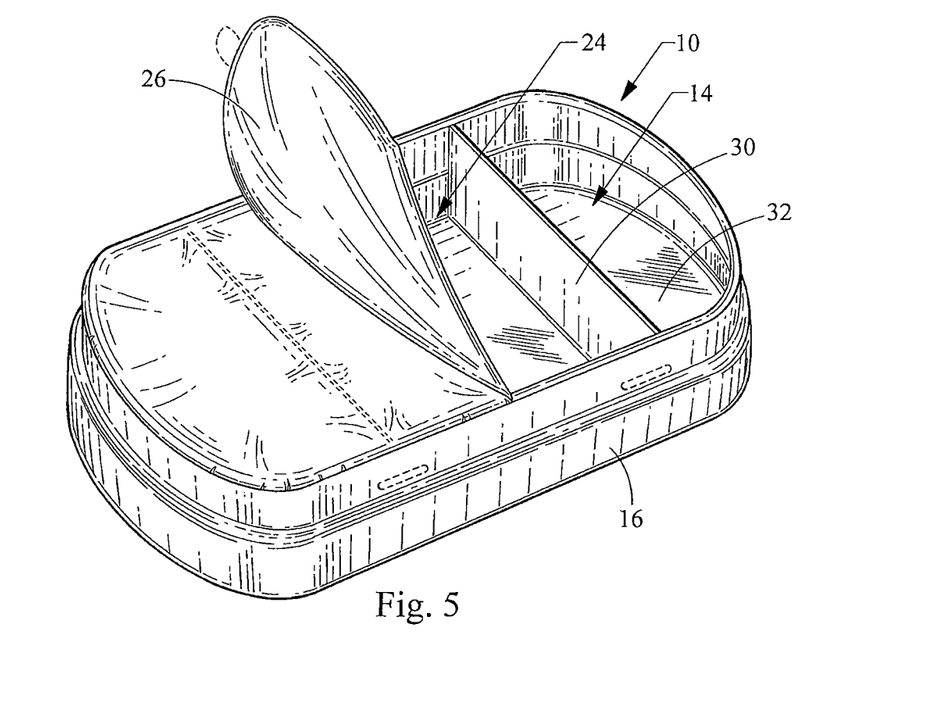
FIG. 5 is an enlarged cross-sectional view of a tobacco product in the form of a snus type of product individually wrapped in an outer package.
Figure 6:
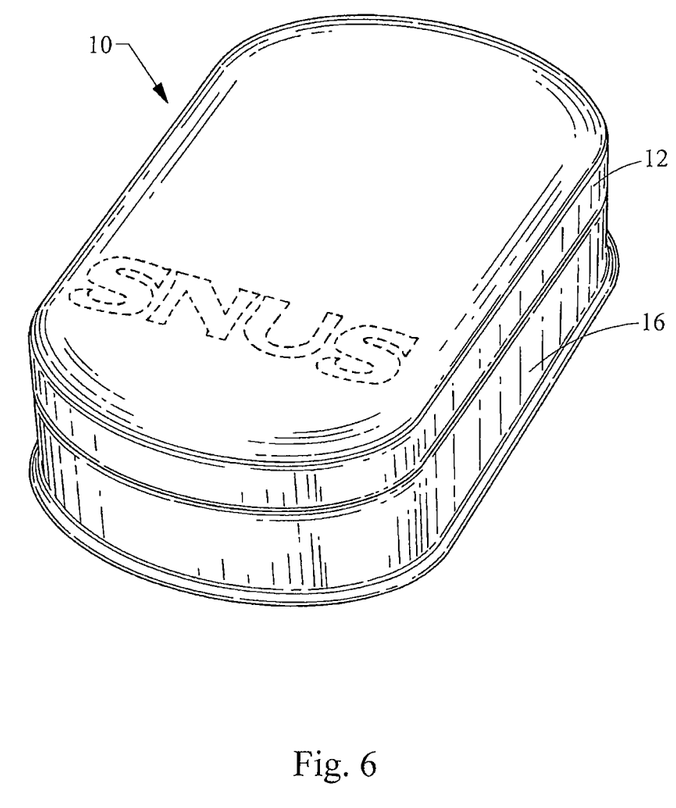
FIG. 6 is a cross-sectional view of a tobacco product in the form of a snus type of product, wherein several snus-type products are wrapped in an outer package and that outer package is contained within a generally cylindrical plastic or metal tin.

Referring to FIGS. 5 and 6, individual pouch sealed tobacco portions 18 are contained within the tin 10. The number of tobacco portions 18 within the tin 10 can vary, and can be a number such as 10, 12, 15, 20, 25 or 30. The tin 10 is in turn packaged within a sealed outer package which is tightly sealed at each end and is constructed from an appropriate material, such that the atmosphere 22 within that outer package, and within the tin 10, is controlled. For example, the atmosphere within the package can be controlled such that the atmosphere is composed of high purity nitrogen gas, or other suitable gaseous species such as carbon dioxide. Such a method is disclosed in U.S. Pat. App. Pub. No. 2008/0173317 to Robinson et al., and is herein incorporated by reference in its entirety. In use, the outer package is opened, the tin 10 is opened, and individual tobacco portions 18 are removed as desired from the tin 10.

Referring to FIGS. 1-3, one embodiment has four separate compartments 24 are provided. Each compartment 24 may contain a different flavor of snuff or snus pouches. Alternatively, all the compartments 24 could contain the same type of smokeless tobacco, and the provision of the separate compartments allows a user to open one compartment 24 at a time. The other compartments 24 remain airtight and the freshness of the smokeless tobacco in the sealed compartments 24 is not compromised.

In the embodiment shown in FIG. 3, a single removable flap 26 covers all four compartments 24 and a user peels back the flap 26 to open one or more compartments 24. Alternatively, each compartment 24 could have an individual flap 28, as shown in FIG. 1, allowing a user to remove one or more flaps to open one or more compartment 24. The flaps 26, 28 could also be resealable. The compartments 24 could take any number of shapes. Some could be larger than others, and contain different amounts or flavors of smokeless tobacco.

The flaps 26, 28 can be constructed from various materials known in the art capable of maintaining an air and moisture tight seal. For example, metal foil/paper laminates, metalized paper, plastic wrappers, metalized polymeric film or low permeability transparent polymeric sheets are effective. Exemplary materials are disclosed in U.S. Pat. Pub. No. 2004/0217023 to Fagg et al. and U.S. Pat. No. 7,124,883 to Thomas et al., both of which are herein incorporated in their entirety. It is preferred to utilize a low-permeability material for the construction of the tin 10 and the internal compartment dividers 30 to further reduce flavors or aromas leeching between the compartments 24. Such a material could be an injection-moldable polymeric material, typically a thermoplastic or thermosetting polymer such as polypropylene, polyethylene terephthalate ("PET") or polyethylene vinyl alcohol. Other exemplary injection-moldable materials that can be utilized for the tin 10 and/or the compartment dividers 30 are acrylonitrile butadiene styrene ("ABS"), polyethylene, polyvinyl chloride ("PVC") and polystyrene. In order to further reduce the leeching of flavors into the tin 10 materials and vice versa, the mold can be lined with aluminum foil such that there is an aluminum layer on the inside surface 32 of the tin 10.

The low-permeability material could also be metallic, and the material used for the lids 12 and body 16 could differ from the material used for the internal dividers 30. Furthermore, the lid 12, body 16, and internal dividers 30 could all be comprised of different materials.

The flaps 26, 28 could also incorporate other features. Words, colors or pictures could be stamped or printed on the flaps 26, 28 to designate the type of tobacco in each compartment 24. The material itself could be colored, rather than having color stamped on it. Adhesives known in the art can be used to seal the flaps 26, 28 in place and to reseal them in place once they have been opened. Exemplary materials that can be utilized to seal the flaps 26, 28 closed may be low, moderate and high tack reclosable adhesives. These adhesives can be based on natural rubber, hot melt rubber (synthetic), acrylic or silicone.

Referring to FIG. 1, there is shown an embodiment of a smokeless tobacco product 18. The tobacco product 18 includes a moisture-permeable pouch 78. The illustrated pouch 78 is sealed closed along its length at an overlap region 82. The overlap region may be formed by sealing the bottom portion of one edge of the pouch 78 over the top portion of the opposite edge of the pouch (e.g., by heat sealing, suitable adhesive, or other suitable means). A solid tobacco material 80 is disposed within the pouch 82.

Suitable packets, pouches or containers of the type used for the manufacture of smokeless tobacco products are available under the trade names "taboka," CatchDry, Ettan, General, Granit, Goteborgs Rape, GrovSnus White, Metropol Kaktus, Mocca Anis, Mocca Mint, Mocca Wintergreen, Kicks, Probe, Prince, Skruf, TreAnkrare, Camel Snus Original, Camel Snus Frost and Camel Snus Spice. The tobacco formulation may be contained in pouches and packaged, in a manner and using the types of components used for the manufacture of conventional snus products. The pouch or fleece provides a liquid-permeable container of a type that may be considered to be similar in character to the mesh-like type of material that is used for the construction of a tea bag. Components of the loosely arranged, granular tobacco formulation readily diffuse through the pouch 78 and into the mouth of the user.

In certain embodiments, an exemplary pouch 78 may be manufactured from materials, and in such a manner, such that during use by the user, the pouch 78 undergoes a controlled dispersion or dissolution. Such pouch materials may have the form of a mesh, screen, perforated paper, permeable fabric, or the like. For example, pouch material manufactured from a mesh-like form of rice paper, or perforated rice paper, may dissolve in the mouth of the user. As a result, the pouch 78 and tobacco formulation each may undergo complete dispersion within the mouth of the user during normal conditions of use, and hence the pouch 78 and tobacco formulation both may be ingested by the user. Other exemplary pouch materials may be manufactured using water dispersible film forming materials (e.g., binding agents such as alginates, carboxymethylcellulose, xanthan gum, pullulan, and the like), as well as those materials in combination with materials such as ground cellulosics (e.g., fine particle size wood pulp). Preferred pouch materials, though water dispersible or dissolvable, may be designed and manufactured such that under conditions of normal use, a significant amount of the tobacco formulation contents permeate through the pouch material prior to the time that the pouch undergoes loss of its physical integrity. If desired, flavoring ingredients, disintegration aids, and other desired components, may be incorporated within, or applied to, the pouch material.

In certain embodiments a container for snus or other smokeless tobacco product may be configured as a pouch made of a fleece fabric material, where the fleece fabric material is configured to have improved characteristics as compared to prior pouch materials. The following embodiments and processes may be used alone or in combination with each other and/or other process while remaining within the scope of the present invention. In each of the following embodiments, the material forming a fleece pouch configured to contain a tobacco formulation is configured to include a flavor-enhancing material. The flavor-enhancing material may enhance flavor actively/directly by releasing a flavorant/flavor modifier and/or passively/indirectly by modifying the surface chemistry of the pouch in a manner allowing transmission of flavor from tobacco contained therein, which flavor may qualitatively differ from flavor transmitted through a pouch lacking a flavor-enhancing material.

In one embodiment, a traditional fleece fabric (e.g., made from viscose/regenerated cellulose) or other pouch material may be treated with a wet chemical solution to confer hydrophilicity thereupon. In one such process, a fleece material is provided, then treated with an aqueous alcohol solution containing a food-grade surfactant. The surfactant may include, for example one or more of sorbitan aliphatic acid ester, polyglycerin aliphatic acid ester, or sucrose aliphatic acid ester (see, e.g., U.S. Pat. No. 7,498,281 to Iwasaki et al., which is incorporated herein by reference).

In another process, a hydrophilic fiber finish may be applied to the polymer used for making the fleece during the spinning of that fiber. In another process, a hydrophilic fabric coating may be applied to pouch material. Similar treatments have been used for tea bags and will reduce any flavor that may be conferred by the fleece itself, and/or will reduce potential interference of the fleece upon flavor transmission therethrough of tobacco contained therein. The treatment solution or another material applied may also include one or more flavorants and/or flavor-enhancing materials (which may not themselves confer a flavor, but that provide a positive impact upon flavor).

In some embodiments, a fiber coating may include a flavorant in addition to and/or included in the hydrophilic coating, where the flavorant may be configured to provide or complement a desired flavor profile. For example, a flavorant may be included that provides a different flavor during use of a pouch of tobacco material when compared with a pouch not including a flavorant applied to the fleece material forming the pouch. In each of the embodiments and examples provided, the hydrophilic material may include and/or be applied with a flavorant. Said flavorants include any materials conferring a desired flavor.

In another embodiment, a traditional fleece fabric (e.g., made from viscose/regenerated cellulose or other polymer) or other pouch material may be coated with a food-grade low-melting biodegradable polymer such as, for example, polycaprolactone. The low-melting biodegradable polymer may be modified by incorporation of one or more flavorants/flavor modifiers, preferably selected to be desirable by users of pouch-contained smokeless tobacco. Polycaprolactone polymer has a 60° C. melting temperature that may be ideal for this application, but those of skill in the art will appreciate that other food-grade polymers may be used within the scope of the presentation. The lower-melting characteristic of this and other polymers (e.g., as compared to rayon and/or other cellulose material) is desirable because—as those of skill in the art will appreciate—it provides for thermal bonding and pouch sealing without the use of acrylic. Specifically, the biodegradable fibers and/or coatings/sheaths described below preferably will include lower melting behavior than bi-component fiber cores and/or other fibers used in a fleece such that application of heat may be performed in a temperature range above the melting point of that material, but below the melting point of said other fibers (e.g., rayon) and/or bi-component core material(s). In this manner, the lower-melting material may provide for thermal bonding of pouch fleece to itself for forming and/or sealing a pouch.

In another embodiment, at least one biodegradable polymer such as, for example, polyhydroxyalkanoate and/or polylactic acid may be used to form fleece fabrics using traditional processes of fleece manufacture. The regenerated cellulose (rayon) known in traditional pouches also may be considered biodegradable, if not treated by acrylic or other substances that—while conferring desirable traits for use—may inhibit its biodegradability. If desirable, the hydrophilicity of the biodegradable polymer may be modified by application of—for example—starch and/or food grade surfactants. The fleece and/or materials applied thereto may be modified by addition of one or more flavorants/flavor modifiers, preferably selected to be desirable by users of pouch-contained smokeless tobacco. For example, at least one flavorant/flavor modifier may be incorporated as microencapsulates, adsorbent materials, and/or in the form of flavored polymers incorporated during a polymer fiber spinning process used to make the fleece. For example, flavorants/flavor modifiers may be incorporated as microencapsulates, adsorbent materials, and/ or in the form of flavored polymers incorporated into one or more surface coatings or other materials applied to the fleece and/or to a formed pouch.

In another embodiment, flavor transmission improvements may be achieved using a wickable fiber such as, for example, the 4DG™ grooved fiber. The grooves of this fiber provide for superior wickability behavior when compared to standard fleece. In one experiment, a 4DG™ fleece material exhibited 2.8 times the wickability of a standard fleece material. This comparison is as measured by distance traveled by a dyed liquid through the fleece. The standard fleece and 4DG™ fleece each absorbed about 50 mL of liquid over the same amount of time (about 450 minutes). However, the dyed liquid traveled almost three times as far through the 4DG™ fleece as through the standard fleece. In a snus pouch application, this efficient transmission of liquid is expected to correspond with improved efficiency in quantity and quality of flavor transmission from snus in the pouch to a user's mouth. In these and other embodiments, grooved fabric (e.g., that produced by Procter and Gamble's proprietary ring rolling process for extensible non-woven materials, hereinafter "P&G ring roll process") may provide similar results, as well as improved elasticity. The ring roll process incrementally stretches non-woven material, and two grooved rollers strain the material in a cross-material-flow direction, typically at high speed under room temperature conditions as described, for example, in U.S. Pat. No. 6,383,431 to Dobrin et al., which is incorporated herein by reference. The elasticity improvement provided by the P&G ring roll process for nonwoven fleece may be significant. For example, typical nonwoven fleece exhibits relatively high strength but low ductility and low toughness (failing at a load of about 900 g/in when subject to 100% strain), while a ring rolled nonwoven fleece may exhibit moderately high strength, with high ductility and high toughness (failing at a load of about 600 g/in when subject to 300% strain).

Biodegradability is related to the specific polymer type(s) used in fleece construction. For example, polyhydroxyalkanoates (PHAs)(e.g., polyhydroxypropionate, polyhydroxyvalaerate, polyhydroxybutyrate, and polyhydroxyoctanoate) are known to be degradable by both aerobic and anaerobic microorganisms, which will allow them to biodegrade in a broad variety of environments. Although PHAs are generally considered difficult to extrude as fibers alone, they may be formed into fibers of acceptable strength by mixing different PHA polymers or mixing PHA's with other polymers, such as—for example—PLA (polylactic acid). PLA is useful as a biodegradable polymer that may be broken down through hydrolytic degradation, biodegradation, thermal degradation, and/or photodegradation, depending upon the environment and modifications performed on the polymer. As another example, polycaprolactone (PCL) is biodegradable, which property may be increased when it is mixed with starch. PLA may be formed as a bi-component fiber with, for example, PHA and/or PCL, which may provide biodegradability, and which may not require an acrylic or other coating to be able to thermoseal pouches made therefrom. PHAs may be formed as a bi-component fiber with, for example, PCL and/or PLA, which may provide wide biodegradability, and which may not require an acrylic or other coating to be able to thermoseal pouches made therefrom.

Plasticized cellulose acetate (PCA) polymers may be used as well in forming fibers and/or coatings that can provide minimal interference with flavor transmission. As one useful feature, PCAs processed with citrate-based plasticizer (e.g., triethyl citrate) may provide melt-processibility in the 170-180° C. temperature range, which is desirable for thermosealing and pouch formation in conjunction with rayon and/or other fibers (e.g., PHAs, PLA) that may be used with PCAs.

This type of construction in keeping with principles of the present invention may provide different features than an acrylic-coated rayon fiber. The current rayon fiber includes an acrylic coating that functions as a fiber binder as well as a pouch-sealing aid. One may exploit natural biodegradability of the rayon fabric by using a biodegradable binder fiber for thermal bonding and pouch sealing. Examples of such fibers are PLA and PHA fibers, both of which can be used as the minor component in a binary (bi-component) fiber mixture. Alternatively, aqueous dispersions of PCL, PLA, or PHA may be used to coat the rayon fibers. The polymers in these dispersions can act as a fiber binder and/or pouch sealing agent.

The following examples are provided in order to further illustrate the present invention, but should not be construed as limiting the scope thereof. The embodiments described in the example encompass a variety of forms, not all of which have necessarily been constructed and tested, but which—in view of the present disclosure—are believed generally practicable within the skill of the art.

EXAMPLE 1

Polylactic Acid Fleece

In one embodiment, a PLA core is spun, during which a hydrophilic fiber finish may be applied. The PLA core may be formed with a generally circular fiber cross-section. The PLA fiber may then be assembled into nonwoven fleece fabric using standard processes. Thereafter, the fabric may be processed by the P&G ring roll process. The resulting fleece can provide desirable hydrophilicity preferably configured to include desirable flavor-transmission characteristics. It can be desirably elastic, promoting maintenance of pouch integrity when formed into snus pouches. Pouches formed of this fleece can be biodegradable.

EXAMPLE 2

Polylactic Acid 4DG™ Fleece

In another embodiment, a PLA core may be formed as a fiber having a 4DG™ cross-section, during which a hydrophilic fiber finish may be applied. The PLA fiber may then be assembled into nonwoven fleece fabric using standard processes. Thereafter, the fabric may be processed by the P&G ring roll process. The resulting fleece can provide desirable hydrophilicity preferably configured to include desirable flavor-transmission characteristics. The wickability of the fleece may be superior to circular-section fibers, providing for enhanced flavor transmission. It may also be elastic, promoting maintenance of pouch integrity when formed into snus pouches. Pouches formed of this fleece may be biodegradable.

EXAMPLE 3

Polyhydroxyalkanoate 4DG™ Fleece

In another embodiment, a PHA core may be formed as a fiber having a 4DG™ cross-section, during which a hydrophilic fiber finish may be applied. The PHA fiber may then be assembled into nonwoven fleece fabric using standard processes. Thereafter, the fabric may be processed by the P&G ring roll process. The resulting fleece can provide desirable hydrophilicity preferably configured to include desirable flavor-transmission characteristics. The wickability of the fleece may be superior to circular-section fibers, providing for enhanced flavor transmission. It may also be elastic, promoting maintenance of pouch integrity when formed into snus pouches. Pouches formed of this fleece may be widely biodegradable, and that biodegradability may be enhanced if starch is included in the PHA fiber.

EXAMPLE 4

Bi-Component PLA/PLA 4DG™ Fleece

In another embodiment, a bi-component PLA fiber may be formed, most preferably having a 4DG™ cross-section. The fiber may include a PLA core having a melting point of about 170° C. and a PLA outer sheath having a melting point of about 130° C. During fiber formation, a hydrophilic fiber coating may be applied. Alternatively, or in addition, a hydrophilic fiber coating may be applied during or after the fiber is assembled into nonwoven fleece fabric. Alternatively, or in addition, a fabric coating may be applied. Thereafter, the fabric may be processed by the P&G ring roll process. The resulting fleece can provide desirable hydrophilicity preferably configured to include desirable flavor-transmission characteristics. The wickability of the fleece may be superior to circular-section fibers, providing for enhanced flavor transmission. It may also be elastic, promoting maintenance of pouch integrity when formed into snus pouches. Pouches formed of this fleece may be biodegradable. It may also provide for thermal bonding (e.g., for sealing pouches) at lower temperatures than other materials currently in use.

EXAMPLE 5

Bi-Component PHA/PHA 4DG™ Fleece

In another embodiment, a bi-component PHA fiber may be formed, most preferably having a 4DG™ cross-section. The fiber may include a PHA core and a PHA outer sheath, which may have a lower melting point than the core. During fiber formation, a hydrophilic fiber coating may be applied. Alternatively, or in addition, a hydrophilic fiber coating may be applied during or after the fiber is assembled into nonwoven fleece fabric. Alternatively, or in addition, a fabric coating may be applied. Thereafter, the fabric may be processed by the P&G ring roll process.

EXAMPLE 6

Bi-Component PHA/PLA 4DG™ Fleece

In another embodiment, a bi-component PHA/PLA fiber may be formed, most preferably having a 4DG™ cross-section. The fiber may include a PHA core and a PLA outer sheath, which may have a lower melting point than the core. During fiber formation, a hydrophilic fiber coating may be applied. Alternatively, or in addition, a hydrophilic fiber coating may be applied during or after the fiber is assembled into nonwoven fleece fabric. Alternatively, or in addition, a fabric coating may be applied. Thereafter, the fabric may be processed by the P&G ring roll process.

EXAMPLE 7

Bi-Component PLA/PHA 4DG™ Fleece

In another embodiment, a bi-component PLA/PHA fiber may be formed, most preferably having a 4DG™ cross-section. The fiber may include a PLA core and a PHA outer sheath, which may have a lower melting point than the core. During fiber formation, a hydrophilic fiber coating may be applied. Alternatively, or in addition, a hydrophilic fiber coating may be applied during or after the fiber is assembled into nonwoven fleece fabric. Alternatively, or in addition, a fabric coating may be applied. Thereafter, the fabric may be processed by the P&G ring roll process.

EXAMPLE 8

Bi-Component Rayon 4DG™ Fleece

In another embodiment, a bi-component fiber may be formed, most preferably having a 4DG™ cross-section. The fiber may include a rayon core and a biodegradable outer sheath (including, e.g., one or more of PHA, PLA, and/or other biodegradable polymer configured to act as fiber binder and pouch sealer), which outer sheath material may having a lower melting point than the core. During fiber formation, a hydrophilic fiber coating may be applied. Alternatively, or in addition, a hydrophilic fiber coating may be applied during or after the fiber is assembled into nonwoven fleece fabric. Alternatively, or in addition, a fabric coating may be applied. Thereafter, the fabric may be processed by the P&G ring roll process.

EXAMPLE 9

Biodegradable Rayon Fleece

In another embodiment, a rayon fiber may be formed and assembled into nonwoven fleece fabric. More highly biodegradable polymer fiber (including, e.g., one or more of PHA, PLA, and/or other biodegradable polymer configured to act as fiber binder and/or pouch sealer based upon a desirable melting temperature range) may be incorporated with the rayon during assembly into fleece fabric. A hydrophilic coating and/or a fabric coating may be applied to the materials as in the other examples. After processing the fibers into fleece fabric, the fabric may be processed by the P&G ring roll process.

EXAMPLE 10

Biodegradable-Coated Rayon Fleece

In another embodiment, a rayon fleece material may be formed using a traditional method. A biodegradable outer coating may be applied to form a hydrophilic coating including, for example, one or more of PHA, PLA, PCL, PCL+ starch and/or other biodegradable polymer configured to act as fiber binder and pouch sealer. The outer coating material may be configured have a lower melting point than the core. Thereafter, the fabric may be processed by the P&G ring roll process.

Descriptions of various components of snus products and components thereof also are set forth in U.S. Pat. Pub. No. 2004/0118422 to Lundin et al., which is incorporated herein by reference. See, also, for example, U.S. Pat. No. 4,607,479 to Linden; U.S. Pat. No. 4,631,899 to Nielsen; U.S. Pat. No. 5,346,734 to Wydick et al.; and U.S. Pat. No. 6,162,516 to Derr, and U.S. Pat. Pub. No. 2005/0061339 to Hansson et al.; each of which is incorporated herein by reference. See, also, the representative types of pouches, and pouch material or fleece, set forth in U.S. Pat. No. 5,167,244 to Kjerstad, which is incorporated herein by reference. Snus products can be manufactured using equipment such as that available as SB 51-1/T, SBL 50 and SB 53-2/T from Merz Verpackungmaschinen GmBH. G.D SpA out of Italy also supplies tobacco pouching equipment. Snus pouches can be provided as individual pouches, or a plurality of pouches (e.g., 2, 4, 5, 10, 12, 15, 20, 25 or 30 pouches) and can be connected or linked together (e.g., in an end-to-end manner) such that a single pouch or individual portion can be readily removed for use from a one-piece strand or matrix of pouches.

The present invention also encompasses various additions and modifications to the fleece material of the pouches. The fleece materials used for the pouches are typically nonwoven materials. Materials such as liquids, encapsulated products, or powders can be incorporated into these nonwoven materials at various points during their manufacture to accomplish many different purposes such as: controlling the pH produced in the user's mouth upon insertion, flavoring, or coloring the fleece.

Nonwovens such as those used in tobacco containing fleece pouches are textiles that are neither woven nor knit. They are generally made by extruding a polymeric material into continuous filaments and then providing a type of bond such as meltblown, spunbond, or spunlaid. Typical synthetic polymers used in manufacturing nonwovens are polypropylene and polyesters. Other types of nonwoven materials are typically manufactured by chopping the extruded filaments into small fibers to form a staple material, and then combining them together to form a net or web which is then bound in a various number of ways. For example, the fibers can be bound mechanically, with an adhesive, or utilizing a binder material. Two common nonwovens are staple nonwovens and spunlaid nonwovens.

Staple nonwovens are made in two steps. The extruded fibers are spun, cut to a few centimeters in length and baled. The bales are dispersed on a conveyor belt and the fibers are spread in a uniform web by a wetlaid, drylaid, or airlaid process or by carding. Staple nonwovens are then bound, typically by using resin or thermal bonding.

Spunlaid nonwovens are made in one continuous process. Fibers are spun and then directly dispersed into a web by deflectors or can be directed with air streams. Spunlaid nonwovens are bonded either by resin or thermally.

There are also other methods of manufacturing nonwovens such as starting with films and fibrillate and serrating or vacuum-forming them with patterned holes. These methods are commonly known in the art.

Several bonding methods can also be used depending on the type of nonwoven that is being manufactured. Thermal bonding comprises applying heat to the nonwoven, and hydroentaglement comprises mechanical intertwining of fibers by water jets. Ultrasonic pattern bonding can also be utilized, and needlefelt comprises mechanical intertwining of fibers by needles. Chemical bonding is also possible using binders such as latex emulsion or solution polymers to chemically join the fibers. Chemical bonding can also be used with binder fibers or powders that soften and melt to hold other non-melting fibers together. One type of cotton staple nonwoven is treated with sodium hydroxide to shrink bond the mat by causing the cellulose-based fibers to curl up and shrink around each other. Finally, meltblown means that the nonwovens are weakly bonded from the air attenuated fibers intertangling with themselves during web formation as well as the temporary tackiness when they are forming.

It is known that nonwoven substrate material can be produced that can give off an aroma and/or a flavor, particularly when moistened. Such a nonwoven substrate and a method for forming it are set forth in U.S. Pat. App. Pub. No. 2004/0048532 to Tharreau, which is herein incorporated by reference in its entirety. The nonwoven substrate of Tharreau may be formed through a process comprising a stage of thermal attachment of cyclodextrin particles to the nonwoven substrate. The resulting product is able to give off an aroma and/or a flavor when it is subsequently moistened with water, or when placed in a user's mouth.

Many different additives, as described above, could be added to the nonwoven during manufacture. For example, as set forth in U.S. Pat. App. Pub. No. 2008/0173317, to Robinson et al., buffers are commonly used in snus formulations to maintain the pH levels during shipping and storage without the need for refrigeration. These buffers are typically added to the snus tobacco formulation themselves, but in the present embodiment of the invention, the buffer solution is also added directly to the nonwoven pouch material during manufacture. In one embodiment of the present method, the buffer solution is added to the polymer material before extrusion of the fiber into filaments. In an alternative embodiment, the extruded fibers are soaked in the buffer solution after extrusion. It is typically added to the snus formulation in an amount that is about 3-12% of the dry weight of the snus formulation. As disclosed in U.S. Pat. App. Pub. No. 2008/0173317, to Robinson et al., improved buffering characteristics over time can be obtained by using sodium carbonate and sodium bicarbonate at a ratio of between about 1:75 and about 1:80, although ratios from 1:20 up to 1:99 are also effective.

Mouth feel may also be affected by modifying the way the pouch allows elements to leech out of the pouch into a user's mouth. The pouch can be constructed such that only certain areas of the pouch are permeable, thus controlling the rate of absorption through the buccal cavity. Another method of controlling mouth feel in a snus tobacco product is to incorporate a form of effervescence into either the tobacco itself, or into the snus fleece pouch as described, for example, in U.S. Pat. Publ. No. 2010/0018540 to Doolittle, et al., which is incorporated herein by reference.

Some fleece snus pouches may change color over time. For pouches that one may wish to retain a certain color (e.g., white), an additive, such as ethylcellulose or nitrocellulose, may be incorporated to the nonwoven material. Alternatively, the method can encompass rotogravure printing the side of the pouch that comes into contact with the tobacco. The pouch could also be coated with alkyl ketene dimer (CAS #144245-85-2). Another method to retard color changes due to contact of tobacco with the pouch is to use two separate layers of fleece. The inside layer would retard the transfer of colorants from the tobacco to the outside layer. The inside layer could be made of lighter weight material configured to act as a spacer preventing contact of tobacco with the outer layer. The inside layer could also be made of different materials such as lightweight, porous paper, or a fine mesh.

A snus pouch could also be used to create a tea-type drink. For example, a snus pouch such as those described above could be soaked in an 8 ounce glass of hot or cold water. The pouch would be allowed to soak or steep in the water for an amount of time so that the tobacco flavor could leach into the water. The tobacco-flavored beverage could then be enjoyed.

Another embodiment of the present invention encompasses adding colorants such as dyes and inks to the nonwoven pouch material to add luster or shine as well as to identify flavors. For example, cinnamon flavored snus could have a red tinted pouch, and mint flavored snus could be provided in a green tinted pouch. Other flavors and corresponding colors are contemplated. The fleece could also be printed with dissolvable materials to identify the type of snus, such as "Camel" or the flavor, such as "mint." Additionally, the inks and dyes could carry additional flavors or other substances. Furthermore, polymers can be engineered to provide certain characteristics such as solubility and degradability.

Tobaccos used for the manufacture of tobacco products pursuant to the embodiments herein may vary. The tobaccos may include types of tobaccos such as flue-cured tobacco, burley tobacco, Oriental tobacco, Maryland tobacco, dark tobacco, dark-fired tobacco and Rustica tobaccos, as well as other rare or specialty tobaccos. Descriptions of various types of tobaccos, growing practices, harvesting practices and curing practices are set forth in *Tobacco Production, Chemistry and Technology*, Davis et al. (Eds.) (1999), which is incorporated herein by reference. See, also, the types of tobaccos that are set forth in U.S. Pat. No. 4,660,577 to Sensabaugh, Jr. et al.; U.S. Pat. No. 5,387,416 to White et al.; U.S. Pat. No. 6,730,832 to Dominguez et al.; and U.S. Pat. No. 7,025,066 to Lawson et al.; U.S. Pat. Pub. Nos. 2007/0062549 to Holton, Jr. et al.; 2007/0186941 to Holton, Jr. et al.; and 2009/0025738 to Humphrey, each of which is incorporated herein by reference. Most preferably, the tobacco materials are those that have been appropriately cured and aged. Especially preferred techniques and conditions for curing flue-cured tobacco are set forth in Nestor et al., Beitrage Tabakforsch. Int., 20 (2003) 467-475 and U.S. Pat. No. 6,895,974 to Peele, which are incorporated herein by reference. Representative techniques and conditions for air curing tobacco are set forth in Roton et al., Beitrage Tabakforsch. Int., 21 (2005) 305-320 and Staaf et al., Beitrage Tabakforsch. Int., 21 (2005) 321-330, which are incorporated herein by reference. See, also U.S. Pat. No. 6,834,654 to Williams.

Tobacco such as that used in snus marketed under the trade names Camel Snus Frost, Camel Snus Original and Camel Snus Spice by R. J. Reynolds Tobacco Company can also be used. Typically, types of tobacco having 1% or less than 1% nicotine content are used in these formulations and the collective nicotine content of the tobacco blend is near about 2% the dry weight of the tobacco, often less than 1.5% of the dry weight of the tobacco, frequently 0.5%-1.25% the dry weight of tobacco and often 1% or less of the dry weight of the tobacco.

The tobacco used for the manufacture of the tobacco product preferably is provided in a shredded, ground, granulated, fine particulate or powder form. The tobacco used for the manufacture of the tobacco product also can be processed, blended, formulated, combined and mixed with other materials or ingredients. For example, the tobacco composition can incorporate salts, sweeteners, binders, colorants, pH adjusters or buffers, fillers, flavoring agents, disintegration aids, antioxidants, humectants, and preservatives. See, for example, those representative components, combination of components, relative amounts of those components and ingredients relative to tobacco, and manners and methods for employing those components, set forth in U.S. Pat. Pub. Nos. 2007/0062549 to Holton, Jr. et al., 2007/0186941 to Holton, Jr. et al., and 2008/0029110 to Dube et al., each of which is incorporated herein by reference. For example, the tobacco product can have the form of a pouch containing a tobacco composition, and a flavored strip or film; the form of a pouch containing a tobacco composition, and a flavored strip or film incorporating finely divided granules of tobacco and/or tobacco extract (e.g., components of a spray dried aqueous extract of tobacco); or the form of a highly processed dissolvable film incorporating finely divided granules of tobacco and/or tobacco extract. Typically, for certain embodiments, the amount of tobacco material within a portion of an individual portion of a smokeless tobacco can be, on a dry weight basis, at least about 30 mg, often at least about 40 mg, and frequently at least about 45 mg; while that amount typically is less than about 200 mg, often less than about 150 mg, and frequently less than about 100 mg. The tobacco material can have the form of processed tobacco parts or pieces, cured and aged tobacco in essentially natural lamina or stem form, a tobacco extract, extracted tobacco pulp (e.g., using water as a solvent), or a mixture of the foregoing (e.g., a mixture that combines extracted tobacco pulp with granulated cured and aged natural tobacco lamina).

A blend of different types of tobacco can also be used. For example, a mixture can contain a blend of 75% flue cured tobacco and 25% other types of tobacco such as burley, Turkish, dark air cured or rare specialty tobaccos. Or, the blend could be 100% of one type of tobacco, such as flue cured.

The moisture content of the tobacco formulation prior to use by a consumer of the formulation may vary. Typically, the moisture content of the tobacco formulation, as present within the pouch prior to insertion into the mouth of the user, is less than about 55 weight %, generally is less than about 50 weight %, and often is less than about 45 weight %. Certain types of tobacco formulations have moisture contents, prior to use, of less than about 15 weight %, frequently less than about 10 weight %, and often less than about 5 weight %. For certain tobacco products, such as those incorporating snus-type tobacco compositions, the moisture content may exceed 20 weight %, and often may exceed 30 weight %. For example, a representative snus-type product may possess a tobacco composition exhibiting a moisture content of about 25 weight % to about 50 weight %, preferably about 30 weight % to about 40 weight %.

The manner by which the moisture content of the formulation is controlled may vary. For example the formulation may be subjected to thermal or convection heating. As a specific example, the formulation may be oven-dried, in warmed air at temperatures of about 40° C. to about 95° C., with a preferred temperature range of about 60° C. to about 80° C. for a length of time appropriate to attain the desired moisture content. Alternatively, tobacco formulations may be moistened using casing drums, conditioning cylinders or drums, liquid spray apparatus, ribbon blenders, mixers available as FKM130, FKM600, FKM1200, FKM2000 and FKM3000 from Littleford Day, Inc., Plough Share types of mixer cylinders, and the like. Most preferably, moist tobacco formulations, such as the types of tobacco formulations employed within snus products, are subjected to pasteurization or fermentation. Techniques for pasteurizing or fermenting snus types of tobacco products will be apparent to those skilled in the art of snus product design and manufacture.

The acid or base content of a tobacco formulation gives it a certain pH. In the present application, "the pH of the tobacco" refers to the ability of the tobacco to provide a certain pH level. The pH of the tobacco formulation can vary. Typically, the pH of that formulation is at least about 6.5, and preferably at least about 7.5. Typically, the pH of that formulation will not exceed about 9, and often will not exceed about 8.5. A representative tobacco formulation exhibits a pH of about 6.8 to about 8.2. A representative technique for determining the pH of a tobacco formulation involves dispersing 2 g of that formulation in 10 ml of high performance liquid chromatography water, and measuring the pH of the resulting suspension/solution (e.g., with a pH meter).

If desired, a buffer can be added to the snus formulation to help maintain the pH levels during shipping and storage without the need for refrigeration. Sodium carbonate alone has been used as a buffer in the past. It is typically added to the snus formulation in an amount that is about 3-12% of the dry weight of the snus formulation. It has been discovered that a new combination of elements provides improved buffering characteristics over time, and when combined with the modified atmosphere packaging described later, the combination nearly eliminates any significant change in pH in snus formulations over time without the need for traditional refrigeration. The preferred buffer formulation is sodium carbonate and sodium bicarbonate at a ratio of between about 1:75 and about 1:80, although ratios from 1:20 up to 1:99 are also effective.

If such a buffer is desired, water is added to a snus tobacco blend to bring the formulation to about 35-36% moisture content. Salt can be added at the level desired, for example at 1.5% of the dry weight of the snus formulation. The mixture is pasteurized at about 212° F. (100° C.) for one hour. The mixture is then brought up to between 50% and 55% moisture content in a solution of the buffer made up of sodium carbonate and sodium bicarbonate in the ratios detailed above. The buffer is added to the snus formulation in an amount that is about 7-15% of the dry weight of the snus formulation bringing the pH from about 9-9.5. The snus is then heated at about 175-185° F. until the pH drops to about 8.0 to 8.3.

Other buffer recipes are also contemplated, although they may not exhibit the same synergy that the sodium carbonate/sodium bicarbonate buffer does in conjunction with carbon dioxide modified atmosphere packaging. Other buffer recipes include sodium carbonate and ammonium bicarbonate at a ratio of 2:3, potassium hydroxide and sodium bicarbonate at a ratio of 1:75, sodium hydroxide and potassium bicarbonate at a ratio of 1:75, and potassium hydroxide, sodium carbonate and sodium bicarbonate at a ratio of 2:5:3. These buffer recipes can be added to the snus formulation as described above, in an amount that is about 7-15% of the dry weight of the snus formulation.

If desired, prior to preparation of the tobacco formulation, the tobacco parts or pieces may be irradiated, or those parts and pieces may be pasteurized, or otherwise subjected to controlled heat treatment. Additionally, if desired, after preparation of all or a portion of the formulation, the component materials may be irradiated, or those component materials may be pasteurized, or otherwise subjected to controlled heat treatment. For example, a formulation may be prepared, followed by irradiation or pasteurization, and then flavoring ingredient(s) may be applied to the formulation. Alternatively, the tobacco formulation can be irradiated or pasteurized after the tobacco formulation has been incorporated within a moisture-permeable packet or pouch (e.g., so as to provide individual containers of snus-type smokeless tobacco product.

Typically, the amount of tobacco formulation within each individual portion (e.g., within each snus-type pouch) is such that there is at least about 50 mg, often at least about 150 mg, and frequently at least about 250 mg, of dry weigh tobacco; and less than about 700 mg, often less than about 500 mg, and frequently less than about 300 mg, of dry weight tobacco. For example, snus-type smokeless tobacco products can have the form of so-called "portion snus."

One exemplary snus-type product possesses about 1 g of a tobacco formulation having a moisture content of about 35 weight %; which tobacco formulation is contained in a sealed fleece pouch having an overall length of about 30 mm, a width of about 16 mm, and a height of about 5 mm, wherein the length of the compartment area of that pouch is about 26 mm due to a seal of about 2 mm width at each end of that pouch. Another exemplary snus-type product possesses about 0.5 g of a tobacco formulation having a moisture content of about 35 weight %; which tobacco formulation is contained in a sealed fleece pouch having an overall length of about 26 mm, a width of about 12 mm, and a height of about 5 mm, wherein the length of the compartment area of that pouch is about 22 mm due to a seal of about 2 mm width at each end of that pouch.

It should be noted that there could be a wide range of changes made to the present embodiments without departing from the scope of the claimed invention. It is therefore intended that the foregoing detailed description be regarded as illustrative rather than limiting, and that it be understood that it is the following claims, including all equivalents, that are intended to define the spirit and scope of this invention.

We claim:

1. A tobacco product configured for insertion into the mouth of a user of that product, the tobacco product comprising:
    a liquid-permeable fleece material pouch containing a tobacco formulation, the tobacco formulation including a granular tobacco composition, wherein material forming the fleece pouch further comprises a hydrophilic surface coating, and wherein fibers of the fleece pouch comprise a 4DG cross-section.

2. The tobacco product of claim 1, wherein the hydrophilicity of the hydrophilic surface is conferred by a food-grade surfactant.

3. The tobacco product of claim 2, wherein the food-grade surfactant comprises one or more of sorbitan aliphatic acid ester, polyglycerin aliphatic acid ester, and sucrose aliphatic acid ester.

4. The tobacco product of claim 1, wherein the fleece pouch further comprises a flavor-enhancing material.

5. The tobacco product of claim 1, wherein the fleece pouch further comprises a food-grade low-melting biodegradable polymer coating an underlying polymer.

6. The tobacco product of claim 1, wherein fibers of the fleece pouch comprise a bi-component material comprising one or more of regenerated cellulose, a polyhydroxyalkanoate, polylactic acid, plasticized cellulose acetate, and polycaprolactone.

7. The tobacco product of claim 1, wherein the fleece pouch is constructed including at least one biodegradable polymer.

8. The tobacco product of claim 7, wherein the biodegradable polymer comprises regenerated cellulose, a polyhydroxyalkanoate, polylactic acid, polycaprolactone, or a combination thereof.

9. The tobacco product of claim 7, further comprising at least one flavorant.

10. The tobacco product of claim 9, wherein the flavorant is incorporated into the fleece.

11. The tobacco product of claim 9, wherein the flavorant is provided as a coating on the fleece, a fiber thereof, or both.

12. A method of making a tobacco product according to claim 1, said method comprising steps of:
  providing fiber for making a fleece material including said 4DG cross-section fibers;
  applying an aqueous solution comprising a food-grade surfactant to the fiber;
  forming fleece material,
  ring-rolling the fleece material to improve elasticity thereof, and
  forming the fleece material into a liquid-permeable fleece material pouch containing a tobacco formulation, the tobacco formulation including a granular tobacco composition, wherein material forming the fleece pouch further comprises a hydrophilic surface coating.

13. The method of claim 12, further comprising applying at least one flavorant.

14. The method of claim 12, further comprising a step of forming fleece material wherein the fleece material formed comprises a biodegradable polymer.

15. A tobacco product made according to the method of claim 12.

16. A tobacco product comprising:
  a ring-rolled fleece material pouch comprising a biodegradable polymer and a food-grade surfactant, which forms a hydrophilic surface of the fleece pouch;
  a flavorant incorporated into material forming the pouch; and
  a granular tobacco composition contained within the pouch.

* * * * *